US011744310B2

(12) United States Patent
Van Cleve

(10) Patent No.: US 11,744,310 B2
(45) Date of Patent: Sep. 5, 2023

(54) SYSTEMS AND METHODS FOR AN INTELLIGENT MOTORCYCLE HELMET

(71) Applicant: Hi Vis Technology, LLC, Chandler, AZ (US)

(72) Inventor: Cody Van Cleve, Apache Junction, AZ (US)

(73) Assignee: Hi Vis Technology, LLC, Chandler, AZ (US)

( * ) Notice: Subject to any disclaimer, the term of this patent is extended or adjusted under 35 U.S.C. 154(b) by 155 days.

(21) Appl. No.: 17/099,645

(22) Filed: Nov. 16, 2020

(65) Prior Publication Data

US 2022/0151328 A1    May 19, 2022

(51) Int. Cl.
    *A42B 3/04*      (2006.01)
    *H04W 4/40*    (2018.01)
    *A42B 3/30*      (2006.01)
    *A42B 3/22*      (2006.01)

(52) U.S. Cl.
CPC ............ *A42B 3/0453* (2013.01); *A42B 3/044* (2013.01); *A42B 3/046* (2013.01); *A42B 3/30* (2013.01); *H04W 4/40* (2018.02); *A42B 3/225* (2013.01)

(58) Field of Classification Search
CPC ....... A42B 3/0453; A42B 3/044; A42B 3/046; A42B 3/30; A42B 3/225; H04W 4/40
See application file for complete search history.

(56) References Cited

U.S. PATENT DOCUMENTS

| 2002/0145865 | A1* | 10/2002 | Gregg | ................... | A42B 3/044 362/800 |
| 2013/0311075 | A1* | 11/2013 | Tran | ...................... | B60W 50/14 701/117 |
| 2018/0106635 | A1* | 4/2018 | Mu | ...................... | G01C 21/3652 |
| 2019/0315268 | A1* | 10/2019 | Garvey | ............. | H04M 1/72412 |

\* cited by examiner

*Primary Examiner* — Khoa D Huynh
*Assistant Examiner* — Erick I Lopez
(74) *Attorney, Agent, or Firm* — Jennings, Strouss & Salmon PLC

(57) ABSTRACT

An intelligent motorcycle helmet system includes a helmet assembly and a first control module incorporated into the helmet assembly and communicatively coupled to a set of helmet-mounted lighting components. A haptic feedback module is incorporated into the helmet assembly. A second control module is configured to be removably mounted to a motorcycle. The first control module selectively activates the helmet-mounted lighting components to reflect the state of the left and right turn signals and the brake light of the motorcycle as determined via the second control module and the lighting state sensing module. The first control module selectively actuates the haptic feedback module during operation of the motorcycle in response to at least one event associated with the motorcycle.

16 Claims, 4 Drawing Sheets

SYSTEMS AND METHODS FOR AN INTELLIGENT MOTORCYCLE HELMET

TECHNICAL FIELD

The present invention generally relates to safety equipment used in connection with the operation of motorcycles and other such motor vehicles and, more particularly, to the design of improved, intelligent motorcycle helmets.

BACKGROUND

Despite recent technological advances in vehicle technology, motorcycles continue to be an extremely risky form of transportation. The National Highway Traffic Safety Administration (NHTSA), for example, estimates that motorcyclists are approximately twenty-seven times more likely than passenger car occupants to die in a crash per vehicle mile traveled.

Many collisions between motorcycles and other vehicles are the result of a lack of situational awareness, particularly on the part of the non-motorcycle driver. Motorcycles are relatively small, their signal/brake lights are not always conspicuous, and as a result, drivers often fail to anticipate their movements.

Motorcycle helmets are known to be about 37% effective in preventing fatal injuries. While motorcycle helmets themselves have improved significantly in recent decades, and have begun to incorporate more advanced electronics, conventional motorcycle helmets still fail to address issues surrounding situational awareness, particularly with respect to the visibility of turn signals, brake lights, running lights, etc. That is, other drivers on the road often fail to appreciate the state and behavior of nearby motorcycles.

Accordingly, there is a long-felt need for motorcycle helmets that address these and other limitations of the prior art.

BRIEF SUMMARY

To achieve the foregoing and other objectives in accordance with the present invention as broadly described herein, an intelligent motorcycle helmet system in accordance with various embodiments includes a helmet assembly and a first control module incorporated into the helmet assembly for controlling a set of helmet-mounted lighting components. A lighting state sensing module is communicatively coupled to a second, bike-mounted control module and is configured to determine the activation state of left and right turn signals and a brake light of the motorcycle. The helmet-mounted lighting components are activated to reflect the state of the left and right turn signals and the brake light of the motorcycle.

A haptic feedback module (e.g., a pair of vibratory components positioned adjacent to the rider's temples) is incorporated into the helmet assembly and is configured to be selectively actuated during operation of the motorcycle in response to at least one event associated with the motorcycle. For example, the haptic feedback may be provided to indicate obstructions in the rider's blind spot, to provide haptic cues associated with turn-by-turn navigation instructions, to indicate motorcycle turn signal activation status, or to indicate low fuel level, overtemperature, low charge percentage (in electric motorcycles). Custom vibration patterns may be provided to convey the appropriate information.

The helmet-mounted control module and bike-mounted control module may be connected wirelessly (e.g., via a Bluetooth LTE), or via a break-away wired connection implemented, for example, with a magnetic interconnect.

BRIEF DESCRIPTION OF THE DRAWING FIGURES

These and other features, aspects, and advantages of the present invention will become better understood with reference to the following description, appended claims, and accompanying drawings, where:

DETAILED DESCRIPTION OF PREFERRED EXEMPLARY EMBODIMENTS

The present subject matter generally relates to systems and methods for an intelligent motorcycle helmet design. It will be understood that the following detailed description is merely exemplary in nature and is not intended to limit the inventions or the application and uses of the inventions described herein. Furthermore, there is no intention to be bound by any theory presented in the preceding background or the following detailed description. In the interest of brevity, conventional techniques and components related to motorcycle operation, helmet design, motorcycle lighting, and the like may not be described in detail herein.

As a threshold matter, the term "motorcycle" is used herein without loss of generality to refer to any form of open-air vehicle of the type with which a helmet is typically worn. Thus, for example, the term "motorcycle" comprehends a variety of two and three-wheeled vehicles (whether powered by a motor, an internal combustion engine, or a human) in addition to standard motorcycles, such as mopeds, scooters, OHVs, quads, side-by-sides, dirt bikes, three-wheeled motorcycles, and the like.

Referring first to the conceptual block diagram shown in FIG. 1, an intelligent motorcycle helmet system in accordance with various embodiments generally includes a helmet assembly (or simply "helmet") 100, a helmet-mounted control module (or simply "control module") 120 attached to, integrated into, or otherwise incorporated into helmet 100, and a set of helmet-mounted lighting components 162 as described in further detail below. Helmet 100 also includes a haptic feedback module (e.g., one or more vibratory components) incorporated into the helmet assembly and communicatively coupled to control module 120.

Figure 4:
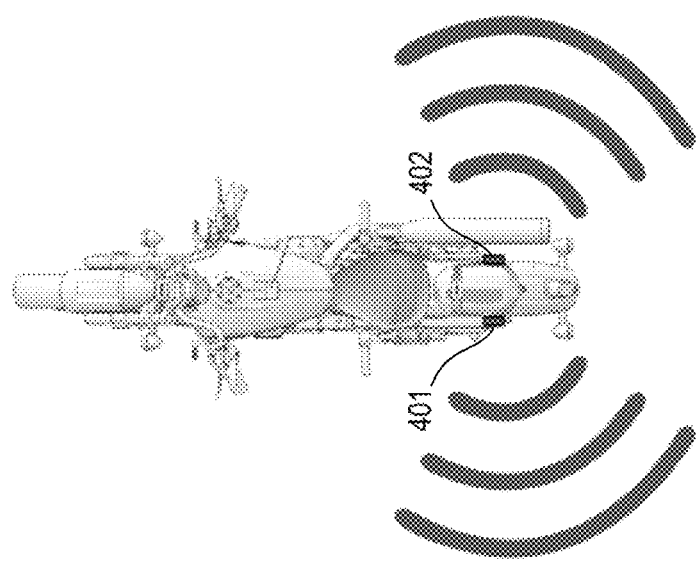
FIG. 4 is a top view of a motorcycle illustrating the position of sensor modules in accordance with one embodiment.

A bike-mounted control module (or simply "control module") 140 is configured to be removably mounted to motorcycle 190 (e.g., in the vicinity of the seat of motorcycle 190), and is communicatively coupled (via any suitable wired or wireless connection 195) to a lighting state sensing module 192 configured to determine (e.g., via a spliced hard-wired connection, a small current transformer, a CANBus interface or other data connection to the onboard vehicle computer, or an inductive sensor) the activation state of left and right turn signals, the brake light, and/or any other lighting components of motorcycle 190. A sensor module 197 (including, for example, lidar and/or sonar sensors) may also be mounted to motorcycle 190 to provide additional information (via connection 198) relating to the environment and other vehicles during operation. In one embodiment, referring briefly to FIG. 4, two modules 401 and 402 are installed at the rear left and rear right corners of the bike, looking outward at a predetermined angle to capture blind spots.

Control module 120 is configured to selectively activate the helmet-mounted lighting components 162 to reflect the state of the left and right turn signals and the brake light (and other lighting components) of motorcycle 190 as determined via the control module 140 and lighting state sensing module 192. Control module 120 is further configured to selectively actuate the haptic feedback module 130 during operation of the motorcycle in response to at least one event associated with the motorcycle—i.e., the state of the turn signals, the presence of an obstruction in the rider's blind spot (as determined via sensor module 197), or an upcoming turn associated with navigation instructions. In some embodiments, the haptic feedback module is used to indicate low fuel level, overtemperature, low charge percentage (in electric motorcycles), or the like.

In some embodiments, control module 140 is further configured to pair or otherwise communicate (e.g., via a wireless connection 128) with a mobile computing device (e.g., a smart-phone, tablet computer, or the like) 132 and any associated networks and external servers. In this way, control modules 140 and 120 may cooperate with mobile device to present the rider with additional functionality, such as route planning and navigational instructions via, for example, Google Maps or Apple Maps, or the like.

Haptic feedback module 130 may be used to convey information to the rider in a variety of ways. In one embodiment, for example, short bursts of vibration are applied to the rider's temple based on the event or situation that is being related to the rider. Such bursts may be distinguished by their number, intensity, and/or pattern. As one non-limiting example, when an obstruction is detected in the blind spot of the motorcycle, users are given three pulses in rapid succession, with each pulse "on" for a duration of 200 ms and "off" time between pulses of 150 ms.

In addition to providing navigational functionality, the mobile computing device 132 may also be used to manage user preferences with respect to the behavior of modules 120 and 140. For example, the rider may be provided with a user interface that allows him or her to specify the amplitude and patterns of vibration provided by haptic feedback module 130, the lighting pattern provided by lighting components 162, and the like.

Control module 120 may be communicatively coupled to control module 140 in a variety of ways (i.e., link 125). In some embodiments, the two modules are connected using a wireless protocol. Non-limiting examples include Bluetooth (e.g., BLE), WiFi (IEEE 802.11), Zigbee, Z-Wave, or any other wireless IOT communication methods now known or later developed.

In some embodiments, however, control module 120 is coupled to control module 140 through a wired connection (e.g., a cord including one or more wires for data communication, and two or more wires for power transmission) that can be manually connected and disconnected by the rider, and which includes some form of break-away feature that causes mechanical and electrical disconnection when the tension in the cord reaches some threshold level. A variety of conventional break-away interconnects may be used for this purpose, including magnetic cord interconnect systems. Such systems may also be used to detect whether a rider has fallen or detect issues related to unintentional disconnection of the cable. This information may, in some embodiments, be conveyed back to a smartphone or other mobile computing device, which thereupon calls for help or otherwise notifies a third party.

Figure 1:
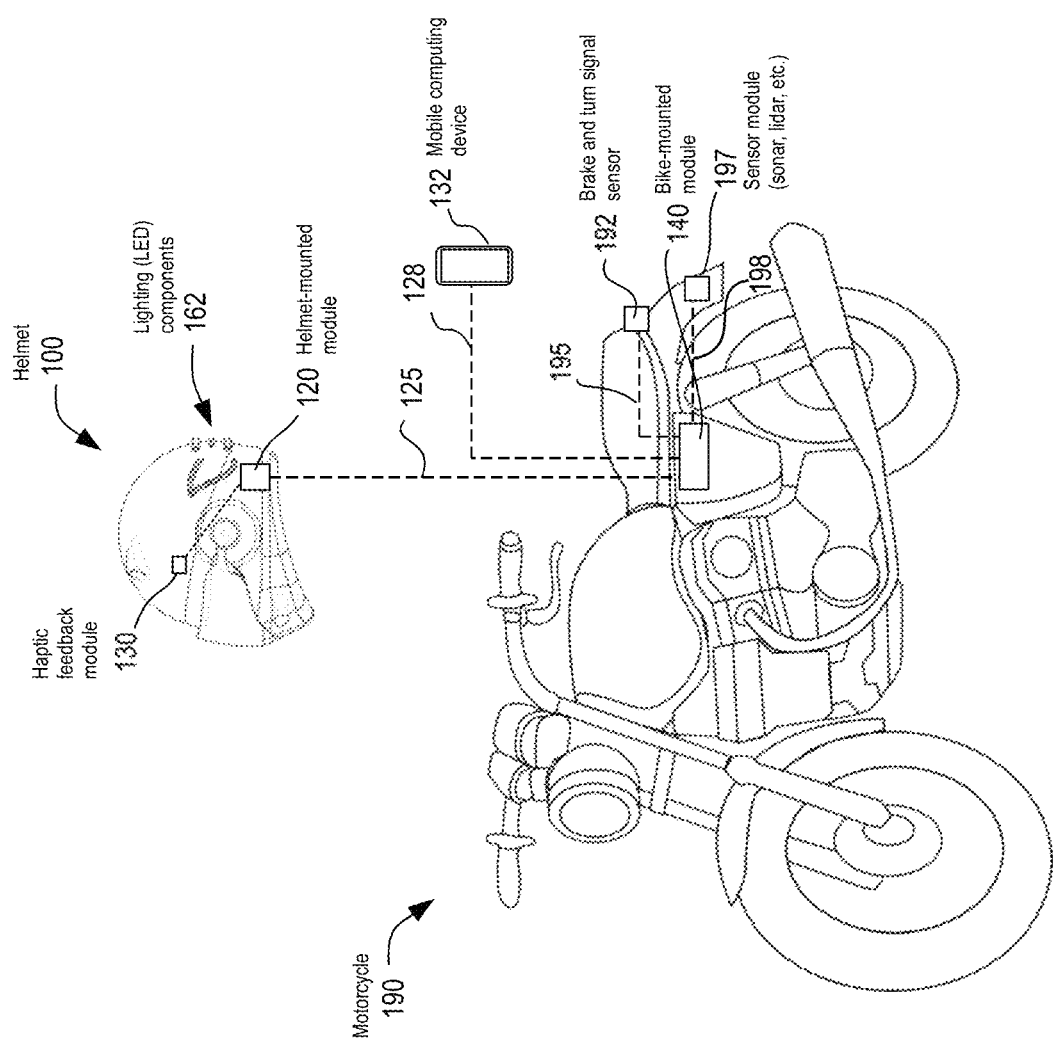
FIG. 1 is a conceptual block diagram of an intelligent motorcycle helmet system in accordance with one embodiment.

While the various components of FIG. 1 are illustrated as communicating through individual data communication channels, it will be appreciated that all or a portion of such communication may be accomplished through the use of a motorcycle digital data bus, such as a controller area network (CAN).

In some embodiments, control module 140 is further configured to wirelessly interface with immediately surrounding vehicles and infrastructure for the purpose of transceiving surrounding vehicle telemetry data. Such data might include, for example, position, speed, and trajectory separate from, or in addition to, the existing vehicle detection method employed by modules 401 and 402. That is, the present invention may be used in the context of "V2V" (Vehicle-to-vehicle) and/or "V2G" (Vehicle-to-grid) systems in concert with the bike-mounted radar sensors (401 and 402).

Figure 2:
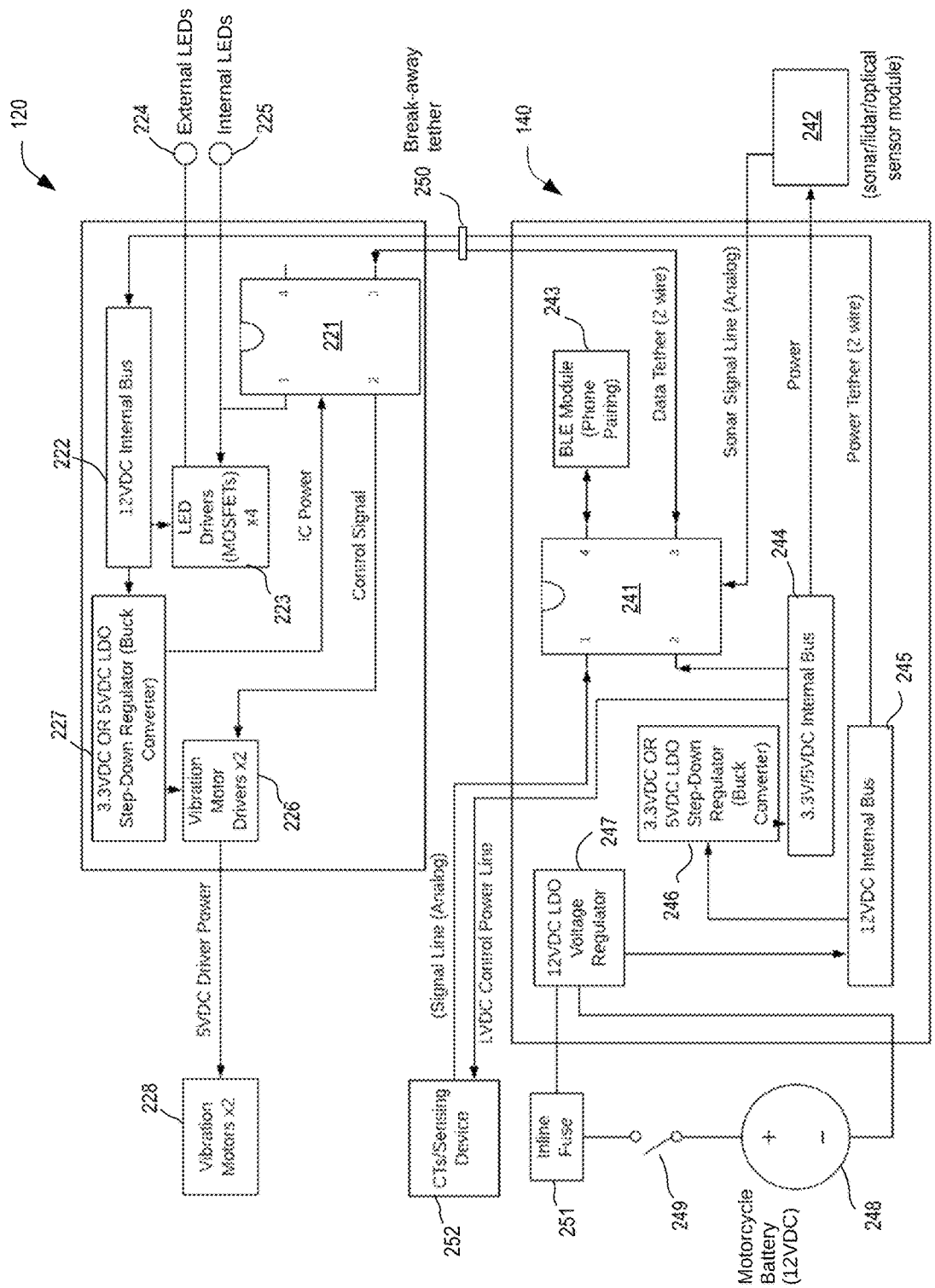
FIG. 2 is a schematic block diagram of a helmet-mounted module and bike-mounted module in accordance with a particular embodiment.

FIG. 2 is a schematic block diagram of a helmet-mounted module and bike-mounted module in accordance with a particular embodiment. As shown, control module 120 (the helmet-mounted module) in this embodiment includes a processor 221 that receives power from a power source 227 (e.g., 3.3 VDC, a buck converter, or the like), which itself receives power from a 12 VDC internal bus 222. A set of LED drivers 223 (e.g., a set of four MOSFET drivers) are used to control external LEDs 224 (corresponding to the lighting components 162 of FIG. 1), and internal LEDs 225. In one embodiment, low-power peripheral LEDs are provided on an inner surface of the helmet and are visible to the rider. A photodiode may be added such that the LEDs auto-dim based on the light level inside the helmet.

Drivers 223 receive power from internal bus 222 and are controlled via processor 221 to achieve the desired lighting pattern. Vibration motor drivers 226 are powered by power module 227 and controlled by processor 221 to drive vibration motors 228, which correspond to the haptic feedback module 130 of FIG. 1.

Control module 120 is coupled to control module 140 via a break-away tether 250 (e.g., a magnetic or interference-fit interconnect), which includes both a data tether (e.g., 2-wire data tether coupled to processor 241), and a power tether, e.g., 2-wire power for supplying 12 VDC from internal bus 245 of module 140 to internal bus 222 of module 120. Internal bus 245 is powered by voltage regulator 247, which itself is coupled to motorcycle battery 248 and an inline fuse 251. A manually actuatable switch 249 is also provided for operation by the rider.

Control module 140 includes a Bluetooth Low Energy (BLE) module 243 for pairing with the mobile computing device 132 of FIG. 1, and is connected via a suitable analog line to a module 242 (e.g., a lidar or machine vision camera), which is powered by internal 3.3V/5 VDC bus 244. Module 242 (which includes any combination of sensors configured to detect the presence of obstacles, etc.) may be incorporated into sensor module 197 of FIG. 1, or may be a standalone module mounted elsewhere on the motorcycle body.

As mentioned briefly above, a sensing device 252 is provided for sensing the state of the turn signals, brake lights, and other lights on motorcycle 190. Sensing device 252 is controlled by processor 241 and powered by internal bus 244, which itself receives power from a buck converter 246 or similar component coupled to the 12 VDC internal bus 245.

Figure 3:
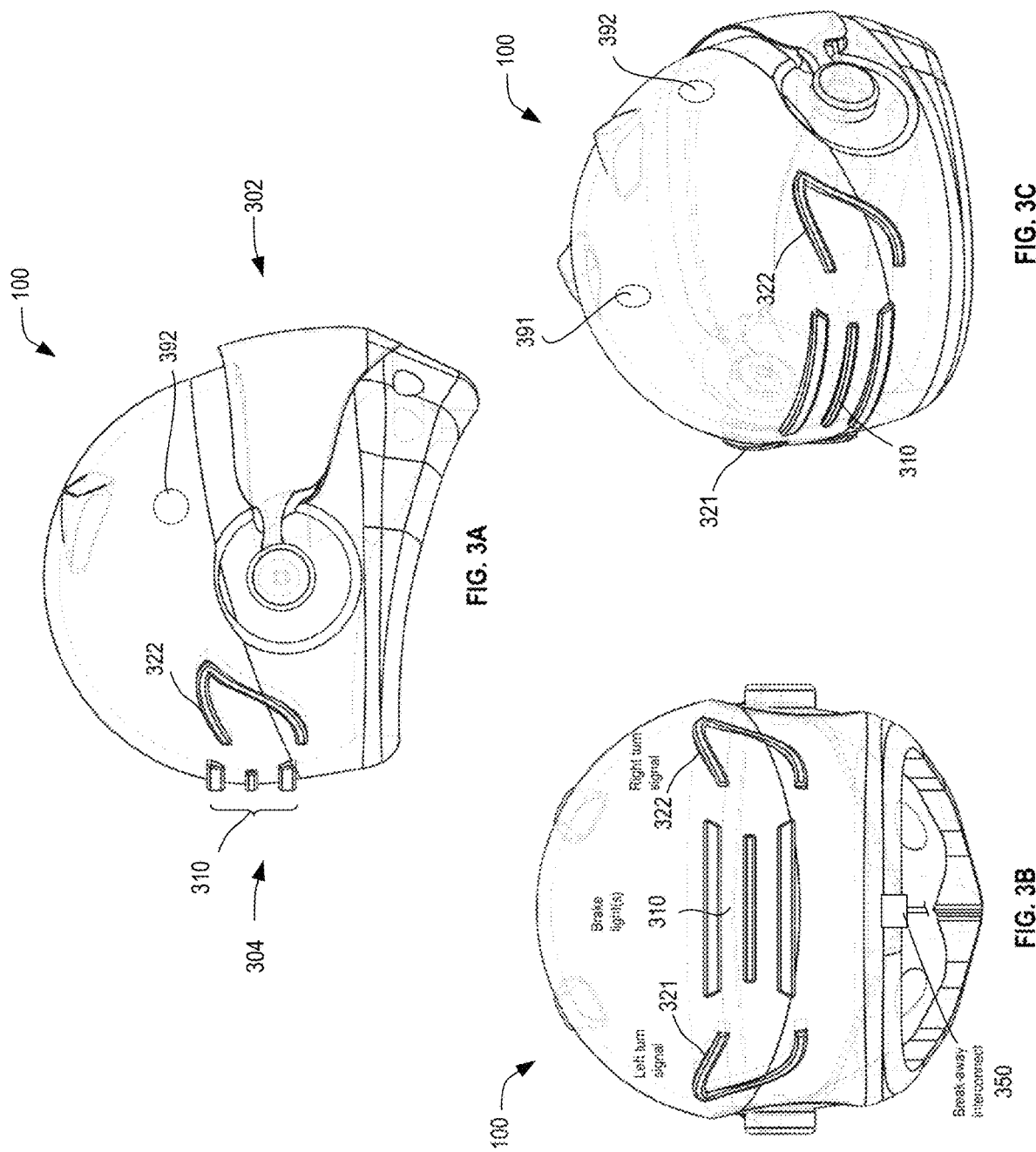
FIGS. 3A-3C illustrate side, back, and isometric views, respectively, of an intelligent motorcycle helmet in accordance with a particular embodiment.

FIGS. 3A-3C illustrate side, back, and isometric external views, respectively, of an intelligent motorcycle helmet 100 in accordance with a particular embodiment. In general, helmet 100 includes a front 302 and a rear 304. A group of lighting components (e.g., single LED components or an array of LED lights) are mounted on or within the rear 304 of helmet 100 as shown. While not shown in the figures, the lighting components are electrically connected to (and selectively actuatable by) the control module incorporated into helmet 100.

It will be understood that helmet 100 will typically include an outer shell (manufactured from fiberglass, composite fiber, polycarbonate, carbon fiber, Kevlar, or the like), an inner layer (e.g., an expanded polystyrene foam liner), a comfort liner, cheek pads, a wind shield, and external vents (i.e., forward-facing, rear-facing, and/or adjustable vents).

In the illustrated embodiment, a series of three, red horizontal bars (310) are provided as brake/running lights. These bars may be actuated simultaneously or individually (e.g., in a wave that travels from bottom to top). In one embodiment, the center light is always active (functioning as a "running" light), and the top and bottom light flash to act as a "grabber" lights. This particular configuration is in no way limiting, however, and any suitable number and shape of brake light components may be provided.

Left and right turns are signaled by yellow lighting components 321 and 322, respectively, which have a chevron-like shape pointing outward as seen from the back. Again, these shapes, and the particular colors used, are not intended to be limiting.

As shown in FIG. 3B, a break-away interconnect 350 may be incorporated at the rear 304 of helmet 100. Interconnect 350 is configured to accept a mating fixture attached to a power/data cord as described above in FIG. 2.

As previously mentioned, a haptic feedback module (130 in FIG. 1) may include one or more vibratory components may be positioned adjacent to the rider's temples and incorporated into the helmet assembly, and are configured to be selectively actuated during operation of the motorcycle in response to at least one event associated with the motorcycle. In the illustrated embodiment, the general locations of these components are indicated by regions 391 and 392 in FIGS. 3A and 3C. It will be understood that these feedback locations are not limited to the size, location, and geometries shown in the figures. Furthermore, in some embodiments the components may be adjustable by the user.

In summary, what has been described are systems and methods for a highly intelligent motorcycle helmet design that incorporates advanced lighting features that track the motorcycle's lighting patterns in a more visible way, and which provides haptic feedback to the rider in a way that is informative without being distracting.

Systems of the present disclosure are, in some instances (e.g., in FIG. 2), described in terms of functional and/or logical block components and various processing steps. It should be appreciated that such block components may be realized by any number of hardware, software, and/or firmware components configured to perform the specified functions. For example, embodiments of the present invention may employ integrated circuit components, e.g., memory elements, digital signal processing elements, logic elements, look-up tables, and/or the like, which may carry out a variety of functions under the control of one or more microprocessors or other control devices. Furthermore, as used herein, the terms "module" or "controller" refer to any hardware, software, firmware, electronic control component, processing logic, and/or processor device, individually or in any combination, including without limitation: application specific integrated circuits (ASICs), field-programmable gate-arrays (FPGAs), dedicated neural network devices (e.g., Google Tensor Processing Units), electronic circuits, processors (shared, dedicated, or group) configured to execute one or more software or firmware programs, a combinational logic circuit, and/or other suitable components that provide the described functionality.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. An intelligent motorcycle helmet system comprising:
    a helmet assembly;
    a first control module incorporated into the helmet assembly and communicatively coupled to a set of helmet-mounted lighting components;
    a haptic feedback module incorporated into the helmet assembly and communicatively coupled to the first control module;
    a second control module configured to be removably mounted to a motorcycle and communicatively coupled to the first control module; and
    a lighting state sensing module communicatively coupled to the second control module and configured to determine the activation state of left and right turn signals and a brake light of the motorcycle;
    wherein the first control module selectively activates the helmet-mounted lighting components to reflect the state of the left and right turn signals and the brake light of the motorcycle as determined via the second control module and the lighting state sensing module;
    wherein the first control module selectively actuates the haptic feedback module during operation of the motorcycle in response to at least one event associated with the motorcycle; and
    wherein at least one of the first control module and second control module are configured to communicate with a mobile computing device, and wherein the first control module is communicatively coupled to the second control module via a break-away wired connection such that, when the break-away wired connection is inadvertently disconnected, a notification is communicated to the mobile computing device.

2. The system of claim 1, wherein the haptic feedback module includes a pair of vibratory components located on opposite sides of the interior of the helmet assembly.

3. The system of claim 1, wherein the first control module selectively actuates the haptic feedback module to indicate turn-by-turn directions based on a navigation application provided by the mobile computing device.

4. The system of claim 1, wherein the first control module selectively actuates the haptic feedback module to indicate the state of the left and right turn signals and the brake light of the motorcycle.

5. The system of claim 1, further including sensor module mounted to the motorcycle, the sensor module including at least a sonar sensor.

6. The system of claim 5, wherein the first control module selectively actuates the haptic feedback module to indicate the presence of obstructions in a blind spot relative to the motorcycle.

7. The system of claim 1, wherein the first control module is communicatively coupled to the second control module through a wireless connection.

8. The system of claim 1, wherein the second control module is communicatively coupled to a vehicle-to-vehicle (V2V) network or a vehicle-to-grid (V2G) network.

9. An intelligent motorcycle helmet comprising:
a helmet assembly;
a first control module incorporated into the helmet assembly, the first control module communicatively coupled to a set of helmet-mounted lighting components and configured to be communicatively coupled to a second control module mounted to a motorcycle; and
a haptic feedback module incorporated into the helmet assembly and communicatively coupled to the first control module;
wherein the first control module selectively activates the helmet-mounted lighting components to reflect states of the left and right turn signals and the brake light of the motorcycle as determined via the second control module;
wherein the first control module selectively actuates the haptic feedback module during operation of the motorcycle in response to at least one event associated with the motorcycle; and
wherein at least one of the first control module and second control module are configured to communicate with a mobile computing device, and wherein the first control module is communicatively coupled to the second control module via a break-away wired connection such that, when the break-away wired connection is inadvertently disconnected, a notification is communicated to the mobile computing device.

10. The helmet of claim 9, wherein the haptic feedback module includes a pair of vibratory components located on opposite sides of the interior of the helmet assembly.

11. The helmet of claim 9, wherein the first control module selectively actuates the haptic feedback module to indicate turn-by-turn directions based on a navigation application provided by the mobile computing device.

12. The helmet of claim 9, further including sensor module mounted to the motorcycle, the sensor module including at least a sonar sensor.

13. The helmet of claim 9, wherein the first control module selectively actuates the haptic feedback module to indicate the presence of obstructions in a blind spot relative to the motorcycle.

14. The helmet of claim 9, wherein the first control module is communicatively coupled to the second control module through a wireless connection.

15. The helmet of claim 9, wherein the first control module is directly or indirectly coupled to a vehicle-to-vehicle (V2V) or vehicle-to-grid (V2G) network.

16. A method of providing feedback to user via an intelligent motorcycle helmet, the method comprising:
providing a helmet assembly configured to be worn by the user, wherein the helmet assembly includes: (1) a first control module communicatively coupled to a set of helmet-mounted lighting components and configured to be communicatively coupled to a second control module mounted to a motorcycle; and (2) a haptic feedback module including a pair of vibratory components located on opposite sides of the interior of the helmet assembly communicatively coupled to the first control module;
selectively activating the helmet-mounted lighting components to reflect states of the left and right turn signals and the brake light of the motorcycle as determined via the second control module; and
selectively actuating the haptic feedback module during operation of the motorcycle in response to at least one event associated with the motorcycle;
wherein at least one of the first control module and second control module are configured to communicate with a mobile computing device, and wherein the first control module is communicatively coupled to the second control module via a break-away wired connection such that, when the break-away wired connection is inadvertently disconnected, a notification is communicated to the mobile computing device.

* * * * *